(12) United States Patent
Kobayashi

(10) Patent No.: US 6,258,289 B1
(45) Date of Patent: Jul. 10, 2001

(54) METHOD OF PRODUCING COATING COMPOSITION FOR MAGNETIC RECORDING

(75) Inventor: Hiroyuki Kobayashi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/420,835

(22) Filed: Oct. 19, 1999

(30) Foreign Application Priority Data

Oct. 19, 1998 (JP) .................................................. 10-296885
Oct. 15, 1999 (JP) .................................................. 11-293931

(51) Int. Cl.$^7$ ........................................................ G11B 5/84
(52) U.S. Cl. ..................... 252/62.54; 366/167.1; 366/348; 427/127; 427/128; 427/129; 427/130; 427/131
(58) Field of Search .................... 252/62.54; 428/692, 428/694 R, 694 B, 694 BC, 694 BG, 694 BO, 694 BU, 694 BL, 694 BN; 366/167.1, 348; 427/127, 128, 129, 130, 131

(56) References Cited

U.S. PATENT DOCUMENTS 5,234,614 * 8/1993 Sakamoto et al. ................. 252/62.54
5,300,244 * 4/1994 Mizuno et al. .................... 252/62.54

FOREIGN PATENT DOCUMENTS 4-47526   2/1992   (JP) .

* cited by examiner

Primary Examiner—C. Melissa Koslow
(74) Attorney, Agent, or Firm—Sughrue, Mion, Zinn, Macpeak & Seas, PLLC

(57) ABSTRACT

In a method of producing a coating composition for magnetic recording, first, a magnetic layer forming material, or the like, containing ferromagnetic powder is put, together with a binder and an organic solvent, into a kneader. The kneader is operated to produce a kneaded mixture. Then, a valve is opened and kneading is continued while a diluent is sprayed by an atomizer for addition to the kneaded mixture. Both diluent spraying and kneading are continued until the kneaded mixture has a viscosity adapted for the next dispersion step. The kneaded mixture kneaded/diluted by a kneading/dilution equipment is then poured into a dispersion equipment through a tank and a connection pipe, which pipe is opened/closed by means of a valve. Then, the kneaded mixture K is dispersed.

5 Claims, 1 Drawing Sheet

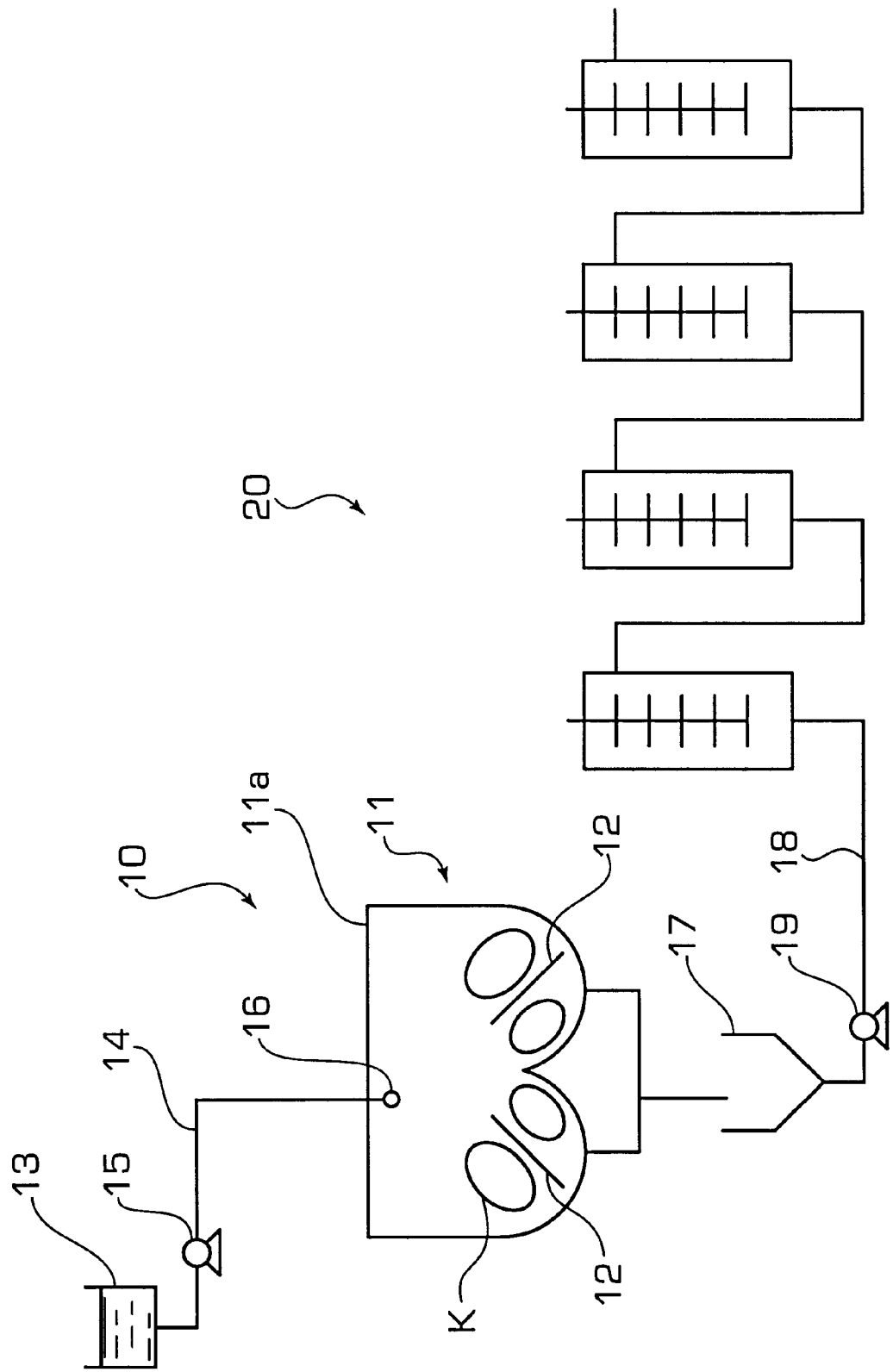

METHOD OF PRODUCING COATING COMPOSITION FOR MAGNETIC RECORDING

BACKGROUND OF THE INVENTION

1. Field of the Invention

The present invention relates to a method of producing a coating composition for magnetic recording, and particularly to a method of producing a magnetic recording coating composition which is characterized by the manner of dilution of a kneaded mixture of magnetic layer forming materials, and the like.

2. Description of the Related Art

A coating type magnetic recording media such as magnetic tapes, magnetic disks, etc., are heretofore produced in a manner in which a magnetic coating composition having ferromagnetic powder dispersed in a resin (binder resin) dissolved in an organic solvent is applied onto a running belt-like non-magnetic support to thereby provide a magnetic layer on the support; orientation treatment, drying/solidification treatment and surface treatment are applied to the magnetic layer successively; and the support with the magnetic layer is cut or punched finally.

Generally, the magnetic coating composition is prepared by dispersion of ferromagnetic powder and additives such as an abrasive material, an antistatic agent, a lubricant, a dispersant, a hardener, etc. in a binder resin. A sophisticated technique is required for mixing relatively fine needle-shaped ferromagnetic powder particles with anisotropy evenly in a binder resin to thereby produce a highly dispersed magnetic coating composition. Therefore, various proposals have been made in the conventional art.

Unexamined Japanese Patent Publication (Kokai) No. 4-47526 discloses a method for producing a magnetic coating kneaded mixture, which comprises a wetting step, a first-half kneading step, a second-half kneading step, and a dilution step. In the wetting step, a magnetic layer forming material provided as a powder and containing ferromagnetic powder, an antistatic agent, and an organic solvent, is added into a kneader and mixed/wetted. It has been suggested that the amount of the organic solvent should be selected to have a predetermined amount. In the first-half kneading step in which a binder resin solution is added continuously into the kneader to prepare a kneaded mixture, it has been suggested that the binder resin and the mixing solvent be selected to have predetermined amounts respectively.

In the second-half kneading step, an organic solvent is added to the kneaded mixture to make the solid content proportion of the kneaded mixture moderate to thereby provide the kneaded mixture as a large lump, and it has been proposed that the addition of the organic solvent be adjusted on the basis of electric power consumed by the kneader. Because the kneaded mixture is provided as a large lump in the aforementioned manner, a large shearing force can be applied to the kneaded mixture by means of the kneader, so that good kneading can be performed.

In the dilution step in which an organic solvent is further added to the kneaded mixture to dilute the kneaded mixture so that the kneaded mixture has a viscosity adapted for the next dispersion step, there is a proposal that the rate and amount of addition of the organic solvent are selected to be predetermined values respectively.

It is said that a magnetic coating composition which is highly dispersed can be obtained by the aforementioned configuration.

Recently, however, high recording density has been required in magnetic recording media, so that a shorter recording wavelength is used. For shorter recording wavelengths, the thickness of the magnetic layer becomes problematic. Since both the self-demagnetization loss at the time of recording and thickness loss at the time of reproducing increase if the thickness of the magnetic layer increases, the thickness of the magnetic layer must be reduced. In order to reduce the thickness of the magnetic layer while securing the surface characteristic of the magnetic layer, a method is therefore employed in which a non-magnetic coating composition is applied onto a support to provide a non-magnetic layer on the support and then a thin magnetic layer is provided on the non-magnetic layer.

The non-magnetic coating composition is prepared by dispersion of non-magnetic powder and additives such as an abrasive material, an antistatic agent, a lubricant, a dispersant, a hardener, etc. in a binder resin.

On the other hand, in order to produce a magnetic recording medium in such a manner that a non-magnetic coating composition is applied onto a support to thereby form a non-magnetic layer on the support and then a thin magnetic layer is formed on the non-magnetic layer, not only the magnetic coating composition but also the non-magnetic coating composition must be produced. Generally, the non-magnetic coating composition is produced in the same manner as that described above for producing the magnetic coating composition. In the case of producing the non-magnetic coating composition, at the time of dilution, however, a large lump of a kneaded mixture comes apart into a plurality of small lumps of the kneaded mixture due to solvent shock. Accordingly, kneading becomes insufficient so that the degree of dispersion of the non-magnetic coating composition cannot be enhanced consequently. If the degree of dispersion of the non-magnetic coating composition is low, a smooth interface between the non-magnetic layer and the magnetic layer cannot be provided. This adversely influences the magnetic layer to obstruct the improvement of the electromagnetic transducing characteristic of the magnetic recording medium consequently.

SUMMARY OF THE INVENTION

It is an object of the present invention to provide a method for producing a magnetic recording coating composition, in which a magnetic recording medium having a high electromagnetic transducing characteristic can be produced in a short time.

In the dilution step described in Unexamined Japanese Patent Publication (Kokai) No. 4-47526, the addition of a solvent, which is controlled with respect to both rate and amount, into the kneader from an injection port which is an outlet of a pipe, is performed so that the solvent comes into contact with a large lump of the kneaded mixture having the solid content proportion adjusted. In such a dilution method, however, the concentration of the kneaded mixture changes rapidly at a position of contact between the kneaded mixture and the solvent, so that a so-called solvent shock occurs. As a result, the large lump of the kneaded mixture comes apart into a plurality of small lumps of the kneaded mixture.

The kneaded mixture in this state cannot be kneaded any more even if an intensive shearing force is applied to the kneaded mixture by the kneader. As a result, the degree of dispersion of the magnetic coating composition cannot be enhanced. This problem obstructed the improvement of the electromagnetic transducing characteristic of the magnetic recording medium.

If attempts were made to restore the kneaded mixture, which came apart into small lumps, to a large lump, the time required for kneading was prolonged. This lowered productivity of the magnetic coating composition and hence productivity of the magnetic recording medium.

The present invention provides a method of producing a coating composition for magnetic recording, comprising: a kneading step of kneading at least one of ferromagnetic powder and non-magnetic powder with both a binder and an organic solvent to thereby prepare a kneaded mixture; a dilution step of adding a diluent to the kneaded mixture to thereby dilute the kneaded mixture until the kneaded mixture has a moderate viscosity; and a dispersion step of dispersing the kneaded mixture after the dilution step; wherein the diluent used in the dilution step is reduced to a spray of droplets and then added to the kneaded mixture.

The present invention also provides a method of producing a coating composition for magnetic recording, comprising: a kneading step of kneading at least one of ferromagnetic powder and non-magnetic powder with both a binder and an organic solvent by means of a batch type kneader having stirring blades to thereby prepare a kneaded mixture; a dilution step of adding a diluent to the kneaded mixture to thereby dilute the kneaded mixture till the kneaded mixture has a moderate viscosity; and a dispersion step of dispersing the kneaded mixture after the dilution step; wherein the rotational speed of the stirring blades in the dilution step is set to be in a range of from 1.2 times to 5 times as high as the rotational speed of the stirring blades in the kneading step.

According to a third aspect of the present invention, in a method of producing a coating composition for magnetic recording according to the first and second aspects, the diluent used in the dilution step is reduced to the spray of droplets so as to have a droplet size in a range of 0.05 mm to 10 mm and then added to the kneaded mixture.

With the above configuration of the first aspect, the diluent is granulated and added to the kneaded mixture in the dilution step. Accordingly, the change of the concentration of the kneaded mixture is small at a position where the kneaded mixture contacts the diluent, so that the large lump of the kneaded mixture is prevented from coming apart into a plurality of small lumps of the kneaded mixture.

With the above configuration of the second aspect, the rotational speed of the stirring blades in the batch type kneader in the dilution step is set to be in a range of 1.2 times to 5 times as high as the rotational speed of the stirring blades in the kneading step. The shearing force applied to the kneaded mixture is proportional to the product of the shear rate and viscosity. In the dilution step, the diluent is added to the kneaded mixture continuously, so that the viscosity of the kneaded mixture is reduced. Therefore, the rotational speed of the stirring blades in the kneader is raised to increase the shear rate to prevent the shearing force applied to the kneaded mixture from being reduced.

Incidentally, if the rotational speed of the stirring blades in the dilution step is lower than 1.2 times the rotational speed of the stirring blades in the kneading step, the shear stress applied to the kneaded mixture is lowered. If the rotation speed of the stirring blades in the dilution step is higher than 5 times as high as the rotational speed of the stirring blades in the kneading step, the kneader becomes becomes expensive. Preferable rotational speed of the stirring blades in the dilution step is in a range of 1.2 times to 3 times as high as the rotational speed of the stirring blades in the kneading step.

With the above configuration of the third aspect, the diluent is granulated into a particle size in a range of 0.05 mm to 10 mm in the dilution step. Generally, the temperature in the interior of a container of the kneader is high. If the particle size of the diluent is smaller than 0.05 mm, the organic solvent soars because of an ascending air current so that the diluent is scarcely kneaded with the kneaded mixture. If the droplet size of the diluent is larger than 10 mm, a solvent shock occurs so that the large lump of the kneaded mixture comes apart into a plurality of small lumps of the kneaded mixture. The droplet size of the diluent is preferably in the range of 0.05 to 3 mm.

BRIEF DESCRIPTION OF THE DRAWINGS

In the accompanying drawings:

The FIGURE shows a configuration of kneading/dilution equipment and dispersion equipment for carrying out the present invention.

A detailed description of the present invention will be provided as follows.

The present invention provides a method of producing a coating composition for magnetic recording, having: a kneading step of kneading at least one of a ferromagnetic powder and a non-magnetic powder with both a binder and an organic solvent to thereby prepare a kneaded mixture; a dilution step of adding a diluent to the kneaded mixture to thereby dilute the kneaded mixture until the kneaded mixture has a moderate viscosity; and a dispersion step of dispersing the kneaded mixture after the dilution step; wherein the diluent used in the dilution step is reduced to a spray of droplets and then added to the kneaded mixture.

The present invention also provides a method of producing a coating composition for magnetic recording, having: a kneading step of kneading at least one of a ferromagnetic powder and a non-magnetic powder with both a binder and an organic solvent by means of a batch type kneader having stirring blades to thereby prepare a kneaded mixture; a dilution step of adding a diluent to the kneaded mixture to thereby dilute the kneaded mixture until the kneaded mixture has a moderate viscosity; and a dispersion step of dispersing the kneaded mixture after the dilution step; wherein the rotational speed of the stirring blades in the dilution step is set to be in a range of 1.2 times to 5 times as high as the rotational speed of the stirring blades in the kneading step.

A solution containing only an organic solvent, a solution containing a binder dissolved in an organic solvent, a solution containing both a binder and a rubber type resin dissolved in an organic solvent, a solution containing a rubber type resin dissolved in an organic solvent, or the like, can be used as the diluent in the dilution step. Further, a solution containing a binder dissolved in an organic solvent is used in the kneading step.

Examples of the organic solvent include ketones (for example, methylethyl ketone, cyclohexanone, diethyl ketone, methylisobutyl ketone, acetone), ethers (for example, diethyl ether, methylethyl ether, dioxane), esters (for example, ethyl acetate, butyl acetate), aromatic solvents (for example, toluene, xylene), alcohols (for example, methanol, ethanol, propanol, butanol), and the like. Those materials may be used singly or in mixture.

A vinyl chloride type copolymer may be used as the binder. Examples of the vinyl chloride type copolymer include vinyl chloride-vinyl acetate copolymer, vinyl chloride-vinyl acetate-vinyl alcohol terpolymer, vinyl chloride-vinyl acetate-acrylic acid terpolymer, vinyl chloride-vinylidene chloride copolymer, vinyl chloride-acrylonitrile copolymer, ethylene-vinyl acetate copolymer, a vinyl chloride type copolymer having a polar group such as hydroxyl group, —COOH, amino-acid group, phosphoric group, —$SO_3Na$, —$SO_2Na$, etc., and an epoxy group introduced therein, and the like.

Specifically, there can be used available products under various called trade names, for example, "DENKA VINYL 1000G", "DENKA VINYL LOH", "DX80", "DX81", "DX82", "DX83" made by Denki Kagaku Kogyo K.K.; "S-LEC A" made by Sekisui Chemical Co., Ltd.; "MPR-TA", "MPR-TA5", "MPR-TSH", "MPR-TMF" made by Nissin Chemical Industry Co., Ltd; "VAGH" made by Union Carbide Corp.; "MR-110", "MR100", "400X110A" made by Nippon Zeon Co., Ltd.; and the like.

Examples of the rubber type resin include polyurethane rubber (polyurethane resin), styrene-butadiene rubber, butadiene rubber, isoprene rubber, chloroprene rubber, isobutylene-isoprene rubber, acrylonitrile-butadiene rubber, chlorinated butyl rubber, acrylic rubber, epichlorhydrine rubber, and the like. Of these rubber type resin examples, polyurethane rubber (polyurethane resin) is particularly preferred.

Examples of the polyurethane rubber include "DESMOCOLL 110", "DESMOCOLL 130", "DESMOCOLL 176", "DESMOCOLL 400", "DESMOCOLL 420", "DESMOCOLL 500", etc. made by Sumitomo BAYER Urethan Co., Ltd.; "NIPPOLLAN 2301", "NIPPOLLAN 2304", "NIPPOLLAN 3022", "NIPPOLLAN 3109", etc. made by Nippon Polyurethane Industry Co., Ltd.; "PANDEX T-5201", "PANDEX T-5205", "PANDEX T-5265", "CRISVON 6109", "CRISVON 6407", "CRISVON 6208", "CRISVON 7309", "CRISVON 7319", "CRISVON 7209" made by Dai Nippon Ink & Chemicals Inc.; "BYLON UR8200", "BYLON UR8300", "BYLON RV530", "BYLON RV280", etc. made by Toyobo Co., Ltd.

The rubber type resin having a polar group such as —OH group, —COOH group, amino group, phosphoric group, sulfonic group, etc., introduced therein is preferable because dispersion is improved. Further, polycarbonate or polyurethane is also preferable because of its tolerance to hydrolysis.

The FIGURE shows a configuration of kneading/dilution equipment and dispersion equipment for carrying out the present invention. As shown in the Figure, the kneading/dilution equipment 10 has a double arm type kneader 11, and a diluent tank 13. The double arm type kneader 11 is a kneader having stirring blades 12. Further, in FIG. 1, a sand grinder is used as the dispersion equipment 20.

The double arm type kneader 11 is covered with a sealing cover 11a so that the upper portion of the kneader 11 is closed. The diluent tank 13 is filled with a diluent. The diluent tank 13 is connected to the kneader 11, specifically, to the sealing cover 11a of the kneader 11, through a connection pipe 14 having a passage which is opened/closed by a valve 15.

Further, an atomizer 16 is provided at an end portion of the connection pipe 14 disposed in the upper portion of the kneader 11. The form of the atomizer is not limited. For example, an atomization nozzle, or the like, attachable to the end portion of the connection pipe 14 can be used.

For production of a magnetic recording coating composition, first, a magnetic layer forming material or the like containing ferromagnetic powder is put, together with both a binder and an organic solvent, into the kneader 11. The kneader 11 is operated to produce a kneaded mixture K.

Then, the valve 15 is opened, so that kneading continues while the diluent reduced to the spray of droplets by the atomizer 16 is sprayed on the kneaded mixture K. In this occasion, both diluent spraying and kneading are continued to obtain a viscosity of the kneaded mixture K adapted for the next dispersion step. Incidentally, diluent spraying may be performed continuously or intermittently.

The kneaded 11 mixture K kneaded/diluted thus by the kneading/dilution equipment 10 is poured into the sand grinder, which is the dispersion equipment 20, through both the tank 17 and the connection pipe 18 having the passage that can be opened/closed by the valve 19. Thus, the kneaded mixture K is dispersed.

Incidentally, the present invention may be carried out also by equipment other than the aforementioned equipment.

For example, the kneader 11 may be configured for blowing the diluent onto the kneaded mixture. In this case, a diluent spray having a very small droplet size (less than 0.05 mm) can be also used, so that a good magnetic recording coating composition can also be produced.

EXAMPLES

Although the present invention will be described below specifically on the basis of examples, the present invention is not limited thereto.

A magnetic recording coating composition was produced by the equipment shown in the Figure. The recipe for the magnetic layer forming material was as follows. In the double arm type kneader 11, those materials were kneaded with 60 parts by weight of cyclohexanone which was a solution.

<Recipe for Magnetic Layer Forming Material>

Metal Magnetic Powder: 100 parts by weight

Phenylphosphonic Acid: 2 parts by weight

Vinyl Chloride Type Copolymer (MR-110 made Nippon Zeon Co., Ltd.): 15 parts by weight Polyester Polyurethane Resin (UR-8600 made by Toyobo Co., Ltd.): 5 parts by weight α-alumina (mean particle size: 0.2 $\mu$m): 5 parts by weight Carbon Black (oil absorption: 63 ml/g; mean particle size: 80 $\mu$m): 1 part by weight The valve 15 was then opened and the diluent was kneaded with the kneaded mixture while the diluent was added to the kneaded mixture under several dilution conditions. The recipe for the diluent was as follows.

<Recipe for Diluent>

Methylethyl Ketone: 350 parts by weight

Cyclohexanone: 90 parts by weight

Each kneaded mixture after dilution was dispersed in the sand grinder 20 for 3 hours. To the dispersion prepared thus, 1 part by weight of (industrial) butyl stearate, 2 parts by weight of (industrial) stearic acid and 7 parts by weight of polyisocyanate (COLLONATE L made by Nippon Polyurethan Industry Co., Ltd.) were added and dispersed by the sand grinder for 15 minutes. Thedispersionwas filtratedby a filterhaving a mean pore size of 1 $\mu$m to thereby obtain a magnetic coating composition.

The magnetic coating composition was applied onto a polyethylene terephthalate support having a thickness of 10 $\mu$m, at a coating speed of 100 m/min, by means of an extrusion type coating head so that the dry thickness of the magnetic coating composition would be 3 $\mu$m. Then, the magnetic coating composition was oriented and dried. Then, after being subjected to surface smoothing, the support carrying the magnetic coating composition was cut into a width of 8 mm to thereby obtain samples (magnetic recording media).

Table 1 shows dilution conditions, in respective examples and comparative examples, of magnetic coating compositions which are coating compositions for magnetic recording, and shows results of evaluation (surface gloss, Y output, treating time proportion, evaluation) of samples produced by use of those magnetic coating compositions.

TABLE 1

|  | Example 1 | Example 2 | Example 3 | Example 4 | Example 5 | Example 6 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|---|---|---|
| Rotation speed ratio (relative to speed in kneading) | 1.2 | 1.2 | 2.0 | 3.0 | 1.1 | 1.0 | 1.2 | 1.2 | 1.0 | 1.2 | 1.1 | 2.0 | 1.0 |
| Method for adding diluent | Atomizer (particle) | | | | | | Atomizer (particle) | No Atomizer | | | | | |
| Particle size of diluent (mm) | 0.05 | 1.0 | 0.05 | 3.0 | 0.5 | 0.05 | 0.03 | — | — | — | — | — | — |
| Adding ratio (weight part/hour) | 20–30 | | | | | | 20–30 | 20–30 | 10–20 | 30–40 | 20–30 | 20–30 | 20–30 |
| Average adding ratio | 25 | | | | | | 25 | 25 | 15 | 35 | 25 | 25 | 25 |
| surface gloss (%) | 178 | 175 | 180 | 177 | 176 | 168 | — | 165 | 161 | 162 | 163 | 168 | 100 |
| Y output (dB) | 1.2 | 1.0 | 1.3 | 1.0 | 0.8 | 0.5 | — | 0.1 | 0.0 | −0.3 | 0.1 | 0.3 | 0.0 |
| Treat time rate | 0.6 | 0.7 | 0.4 | 0.6 | 0.7 | 0.7 | — | 0.8 | 1.8 | 0.8 | 0.8 | 0.7 | 1.0 |
| Evaluation | A | A | A | A | B | B | D | C | C | C | C | C | C |

In the sample according to Comparative Example 1, the particle size of the diluent was so small that the diluent soared because of an ascending air current in the kneader 11. As a result, dilution could not be performed.

Incidentally, the surface gloss shows a value obtained when the gloss of a magnetic layer surface at an incidence angle of 45° and at a reflection angle of 45° was measured with a standard glossmeter (made by Suga Test Instruments Co., Ltd.) on the assumption that the gloss of a standard surface for the standard glossmeter was regarded as 100%. It is preferable that the surface gloss is high.

Further, the Y output is a kind of scale of an output and shows a value which is obtained in a manner so that a 50% white video signal was recorded on the basis of a reference recording current, and an average of the envelope of the reproduction output of the recorded signal was measured by means of an oscilloscope (EV-S900 made by SONY Corporation) on the assumption that the value of the sample in Comparative Example 7 was regarded as 0 dB. It is preferable that Y output is high and is 1.0 or more.

Further, the treating time proportion T/TO was calculated when T is the required time for the dilution step, and TO is the required time for the dilution step in Comparative Example 1.

Evaluation was performed in four steps, i.e., A, B, C and D. "A" means that the product quality and the process condition were sufficiently satisfied. "B" means that the product quality and the process condition were acceptable. "C" means that the product quality had problems for practical use. "D" means that the dilution was not able to be performed.

The effect of the present invention is apparent from the results in Table 1.

First, as shown in Examples 1 to 4, when the diluent is granulated and the rotational speed of the stirring blades in the dilution step is raised 1.2 times or higher than that in kneading, both the surface gloss and Y output which are important for improvement of electromagnetic transducing characteristic are enhanced greatly. Further, the treating time proportion is reduced, so that the time required for dilution is shortened.

Further, even if the diluent is reduced to a spray of droplets so that the rotational speed of the stirring blades in the dilution step is less than 1.2 times of that in kneading step as in Examples 5 and 6, since the average diameters are set to be 0.5 mm and 0.05 mm, respectively, it is possible to enhance the surface gloss and Y output.

As described above, according to the present invention, a magnetic recording medium having a high electromagnetic transducing characteristic can be produced in a short time.

What is claimed is:

1. A method of producing a coating composition for magnetic recording, comprising:
   a kneading step of kneading at least one of a ferromagnetic powder and a non-magnetic powder with both a binder and an organic solvent to thereby prepare a kneaded mixture;
   a dilution step of adding a diluent to said kneaded mixture to thereby dilute said kneaded mixture until said kneaded mixture has a moderate viscosity; and
   a dispersion step of dispersing said kneaded mixture after said dilution step;
   wherein said diluent used in said dilution step is reduced into a spray of droplets and then added to said kneaded mixture.

2. The method of producing a coating composition for magnetic recording according to claim 1, wherein said kneading step is performed by means of a batch type kneader having stirring blades to thereby prepare a kneaded mixture; and a rotational speed of said stirring blades in said dilution step is set to be in a range of 1.2 times to 5 times as high as the rotational speed of said stirring blades in said kneading step.

3. The method of producing a coating composition for magnetic recording according to claim 1, wherein said diluent used in said dilution step is reduced into said spray of droplets so as to have a droplet size in a range of 0.05 mm to 10 mm and then added to said kneaded mixture.

4. A method of producing a coating composition for magnetic recording, comprising:
   a kneading step of kneading at least one of a ferromagnetic powder and a non-magnetic powder with both a binder and an organic solvent by means of a batch type kneader having stirring blades to thereby prepare a kneaded mixture;
   a dilution step of adding a diluent to said kneaded mixture to thereby dilute said kneaded mixture until said kneaded mixture has a moderate viscosity; and
   a dispersion step of dispersing said kneaded mixture after said dilution step;
   wherein a rotational speed of said stirring blades in said dilution step is set to be in a range of 1.2 times to 5 times as high as the rotational speed of said stirring blades in said kneading step.

5. The method of producing a coating composition for magnetic recording according to claim 4, wherein said diluent used in said dilution step is reduced into a spray of droplets so as to have a droplet size in a range of 0.05 mm to 10 mm and then added to said kneaded mixture.

* * * * *